US012785336B2

(12) United States Patent
Yokoyama

(10) Patent No.: US 12,785,336 B2
(45) Date of Patent: Nov. 3, 2026

(54) JUNCTION CONNECTOR

(71) Applicant: 3M INNOVATIVE PROPERTIES COMPANY, St. Paul, MN (US)

(72) Inventor: Shuhei Yokoyama, Sagamihara City (JP)

(73) Assignee: 3M Innovative Properties Company, St. Paul, MN (US)

( * ) Notice: Subject to any disclaimer, the term of this patent is extended or adjusted under 35 U.S.C. 154(b) by 310 days.

(21) Appl. No.: 18/681,940

(22) PCT Filed: Aug. 8, 2022

(86) PCT No.: PCT/IB2022/057374

§ 371 (c)(1),
(2) Date: Feb. 7, 2024

(87) PCT Pub. No.: WO2023/021368

PCT Pub. Date: Feb. 23, 2023

(65) Prior Publication Data

US 2025/0141163 A1 May 1, 2025

Related U.S. Application Data

(60) Provisional application No. 63/234,825, filed on Aug. 19, 2021.

(51) Int. Cl.
*H01R 13/74* (2006.01)
*H01R 13/621* (2006.01)

(52) U.S. Cl.
CPC ....... *H01R 13/748* (2013.01); *H01R 13/6215* (2013.01)

(58) Field of Classification Search
CPC .......................... H01R 13/748; H01R 13/6215
(Continued)

(56) References Cited

U.S. PATENT DOCUMENTS 4,634,203 A 1/1987 Noyes
5,342,216 A * 8/1994 Davis ................ H01R 13/6593 439/362

(Continued)

FOREIGN PATENT DOCUMENTS

CN 109586101 A 4/2019
JP S5212140 U 7/1975

(Continued)

OTHER PUBLICATIONS

"D-Sub Connector", Harting, pp. 1-2.

(Continued)

*Primary Examiner* — Harshad C Patel
(74) *Attorney, Agent, or Firm* — Jonathan L. Tolstedt

(57) ABSTRACT

A connector assembly is disclosed. The connector assembly includes a connector comprising a dielectric housing, a plurality of electrically conductive terminals disposed at least partially in the dielectric housing, and a connector support assembled to the connector. The connector support includes a pair of U-shaped side supports disposed on opposite sides of the dielectric housing and a pair of elongated fasteners for fastening the connector to a plate. A cable includes a plurality of conductors received inside the dielectric housing through cable opening of the housing and terminated at the termination portions of the conductive terminals.

19 Claims, 10 Drawing Sheets

(58) Field of Classification Search
USPC .......................................................... 439/544
See application file for complete search history.

(56) References Cited

U.S. PATENT DOCUMENTS

| | | | | |
|---|---|---|---|---|
| 5,647,758 | A * | 7/1997 | Ichikawa | H01R 13/6215 439/364 |
| 5,820,412 | A * | 10/1998 | Koegel | H01R 13/6593 439/607.51 |
| 6,017,245 | A * | 1/2000 | Karir | H01R 13/506 439/607.45 |
| 6,203,341 | B1 * | 3/2001 | Chen | H01R 13/6215 439/186 |
| 6,406,192 | B1 | 6/2002 | Chen et al. | |
| 6,821,140 | B2 * | 11/2004 | Wu | H01R 13/6215 439/362 |
| 7,491,083 | B2 * | 2/2009 | Shi | H01R 13/6275 439/358 |
| 7,544,084 | B1 * | 6/2009 | Dutton | G02B 6/406 439/465 |
| 8,062,054 | B2 * | 11/2011 | Su | H01R 13/648 439/607.45 |
| 9,711,888 | B2 * | 7/2017 | Sawabe | H01R 13/512 |
| 9,853,395 | B2 * | 12/2017 | Tanaka | H01R 13/6215 |
| 2003/0199178 | A1 | 10/2003 | Goodwin et al. | |
| 2005/0070145 | A1 * | 3/2005 | Huang | H01R 13/6215 439/246 |
| 2008/0166905 | A1 | 7/2008 | Murphy et al. | |
| 2011/0165797 | A1 | 7/2011 | Takeuchi | |
| 2015/0333432 | A1 * | 11/2015 | Wu | H01R 13/502 439/39 |
| 2017/0093086 | A1 * | 3/2017 | Tanaka | H01R 13/516 |

FOREIGN PATENT DOCUMENTS

| | | | |
|---|---|---|---|
| JP | 3151478 | U | 6/2009 |
| JP | 2014165092 | A | 9/2014 |
| JP | 2014203814 | A | 10/2014 |
| JP | 06727756 | B2 | 9/2016 |
| KR | 20010070267 | A | 7/2001 |

OTHER PUBLICATIONS

"HDR-E Type Cable Cover (RoHS)", HTK, Honda Tsushin Kogyo Co., Ltd., HDR-E26LPKPB, 2017, p. 1.

International Search Report for PCT International Application No. PCT/IB2022/057374, mailed on Nov. 21, 2022, 4 pages.

* cited by examiner

JUNCTION CONNECTOR

CROSS REFERENCE TO RELATED APPLICATIONS

This application is a national stage filing under 35 U.S.C. 371 of PCT/IB2022/057374, filed Aug. 8, 2022, which claims the benefit of U.S. Provisional Application No. 63/234,825, filed Aug. 19, 2021, the disclosures of which are incorporated by reference in their entireties herein.

BACKGROUND

Junction connectors for connecting cables and cable assemblies to other pieces of electronic hardware are common in the industry. Junction connectors having improved resistance to high temperatures afford increased flexibility and longevity over conventional junction connectors.

SUMMARY

In some aspects of the present disclosure, a connector assembly is disclosed. The connector assembly can include a connector comprising a dielectric housing having a mating front end for mating with a mating connector and an opposite rear end defining a cable opening therein, a plurality of electrically conductive terminals disposed at least partially in the dielectric housing and comprising mating portions disposed proximate the mating front end of the dielectric housing for making electrical contact with corresponding terminals of the mating connector, and termination portions. The connector can also include a connector support assembled to the connector and including a pair of U-shaped side supports disposed on opposite sides of the dielectric housing. Each of the U-shaped side supports can have an elongated base disposed along, and substantially co-extensive with, a corresponding side of the dielectric housing, a first leg extending from a first end of the base and disposed on and facing the rear end of the dielectric housing and a second leg extending from an opposite second end of the base and disposed on and facing the front end of the dielectric housing, the first and second legs can define respective first and second openings therein. The connector support can also include a pair of elongated fasteners for fastening the connector to a plate, each of the elongated fasteners engaging a corresponding side support in the pair of side-supports such that a rear portion of the elongated fastener is disposed in the first opening of the corresponding side support, a front portion of the elongated fastener is disposed in the second opening of the corresponding side support, and a middle portion of the elongated fastener, extending between and connecting the rear and the front portions, is disposed inside of the housing, wherein the elongated fastener is tightenable and securable against the corresponding side support. A cable can include a plurality of conductors received inside the dielectric housing through the cable opening of the housing and terminated at the termination portions of the conductive terminals.

In some aspects of the present disclosure, a connector assembly is disclosed. The connector assembly can include a connector comprising a dielectric housing having a mating front end for mating with a mating connector and an opposite rear end defining a cable opening therein, and a plurality of electrically conductive terminals disposed in the dielectric housing and comprising mating portions disposed proximate the mating front end of the dielectric housing for making electrical contact with corresponding terminals of the mating connector, and termination portions. A connector support can be assembled to the connector and can include a back support disposed outside and at the rear end of the dielectric housing and defining a center opening aligned with the cable opening and a pair of opposing side openings on opposite sides of the center opening, a plurality of elongated rods oriented along a mating direction (x-axis) of the connector and disposed inside of the housing extending from the rear end of the housing to the front end of the housing, and a pair of elongated fasteners for fastening the connector to a plate. Each of the elongated fasteners can engage the back support such that a rear portion of the elongated fastener is disposed in a corresponding side opening of the back support. A front portion of the elongated fastener can be disposed outside and adjacent the front end of the housing, and a middle portion of the elongated fastener, extending between and connecting the rear and the front portions, can be disposed inside of the housing, wherein the elongated fastener can be tightenable and securable against the back support. A cable can include a plurality of conductors received inside the dielectric housing through the cable opening of the housing and the center opening of the back support and terminated at the termination portions of the conductive terminals.

In some aspects of the present disclosure, a connector is disclosed. The connector can include a dielectric housing having a mating end for mating with a mating connector and an opposite cable end, the mating and cable ends can be spaced apart along a mating direction (X-axis) of the connector, and the dielectric housing can be susceptible to an unacceptable deformation when exposed to at least one of temperature and pressure in their respective normal operating ranges. A plurality of electrically conductive terminals can be disposed in the dielectric housing and can include mating portions disposed proximate the mating end of the dielectric housing for making electrical contact with corresponding terminals of the mating connector, and termination portions configured to at least make electrical contact with a plurality of conductors of a cable. A plurality of spaced apart metal supports can be assembled to the dielectric housing such that when the connector is mated and tightly secured to the mating connector, the plurality of spaced apart metal supports prevents the unacceptable deformation of the dielectric housing due to the at least one of the temperature and pressure in their respective normal operating ranges.

DETAILED DESCRIPTION

Figure 1:
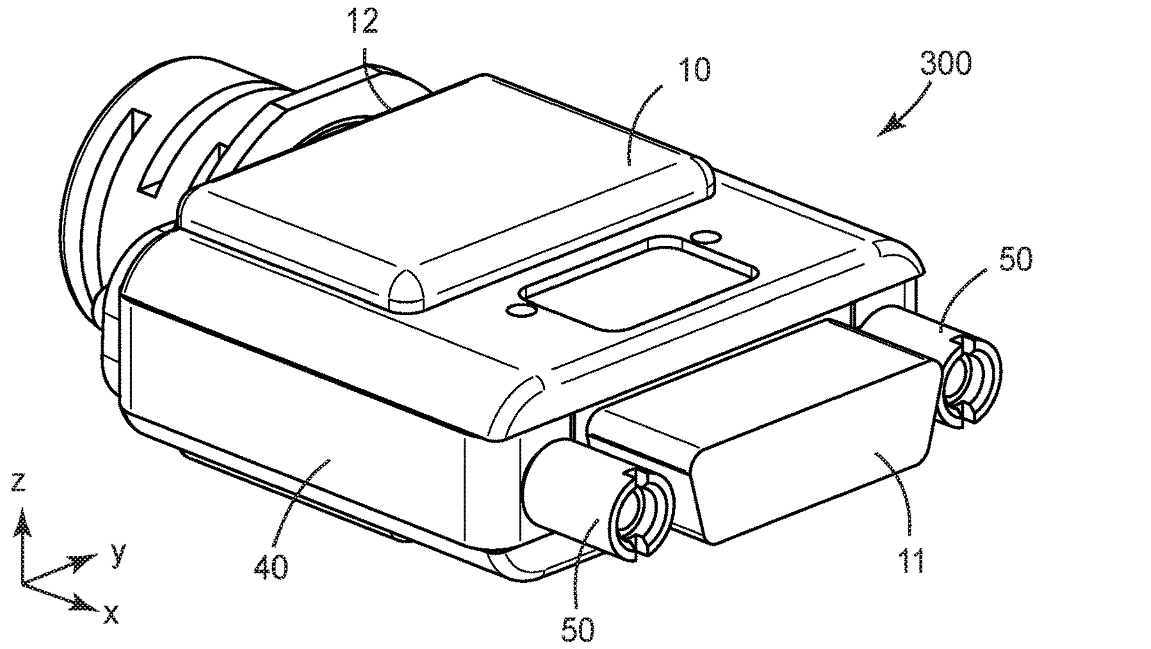
FIG. 1 is an upper perspective view of a connector assembly according to exemplary embodiments of the present disclosure.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

Figure 2:
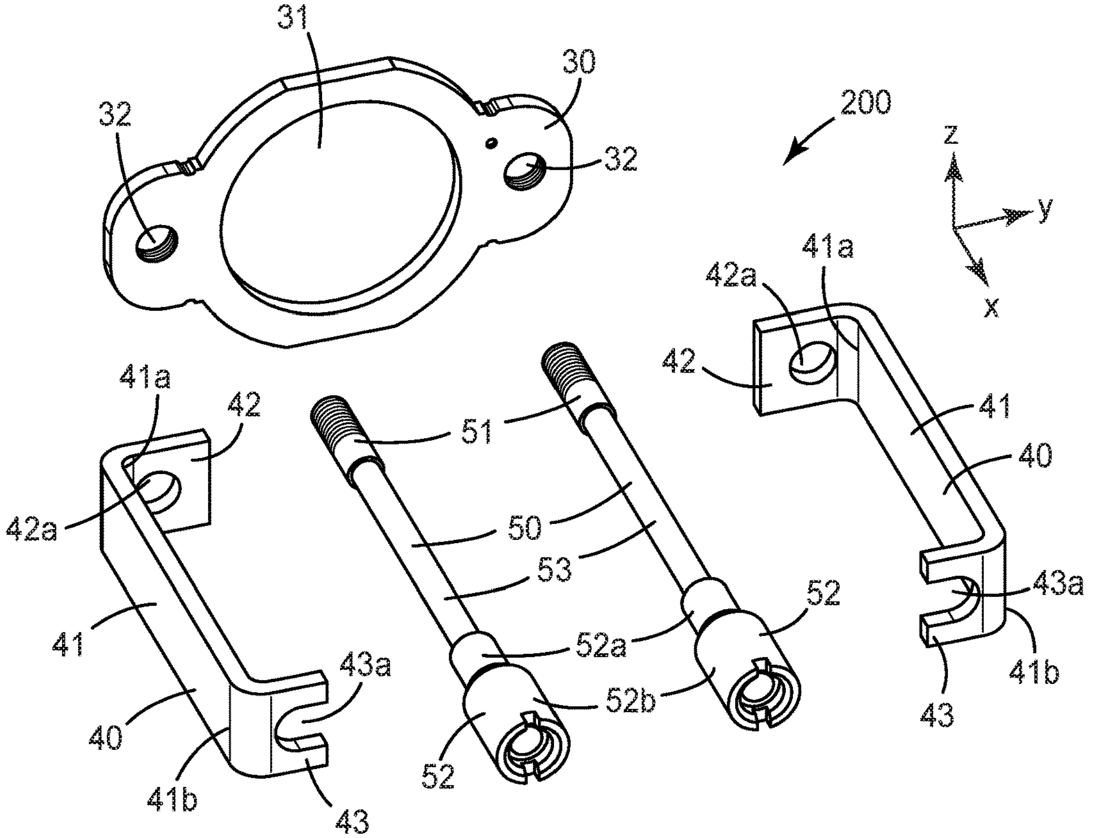
FIG. 2 is an upper perspective view of a back support, side supports, and elongated fasteners according to exemplary embodiments of the present disclosure.
Figure 3:
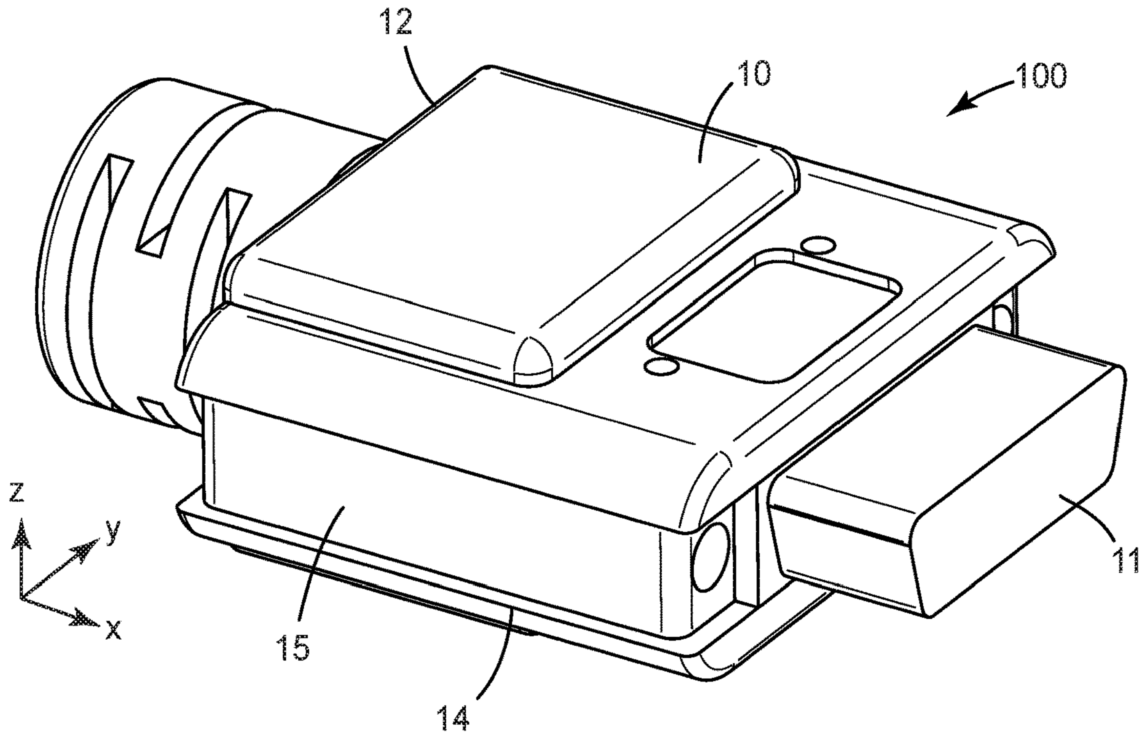
FIG. 3 is an upper perspective view of a connector according to exemplary embodiments of the present disclosure.
Figure 4:
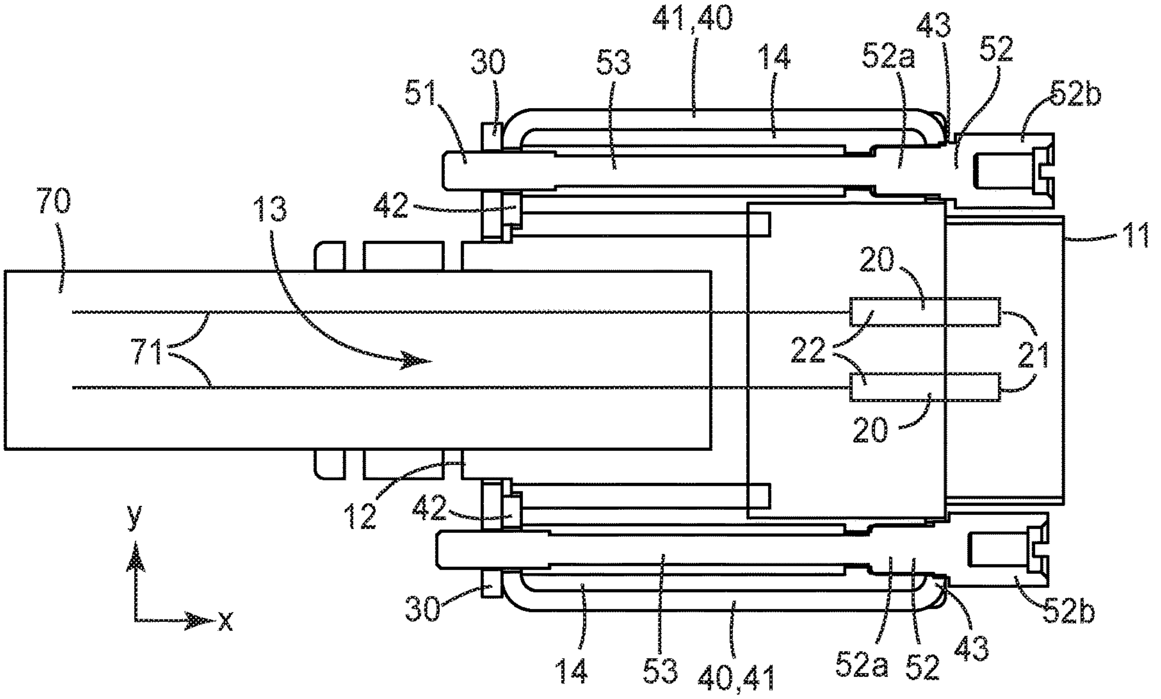
FIG. 4 is a cross-sectional view of the connector assembly of FIG. 1 according to exemplary embodiments of the present disclosure.

Turning to the figures, FIG. 1 is an upper perspective view of a connector assembly, FIG. 2 is an upper perspective view of a back support, side supports, and elongated fasteners, FIG. 3 is an upper perspective view of a connector, and FIG. 4 is a cross-sectional view of the connector assembly of FIG. 1 according to exemplary embodiments of the present disclosure. As can be seen in the figures, an X direction can be orthogonal to a Y direction, and each of the X direction and the Y direction can be orthogonal to a Z direction. For clarity, moving rearwardly along the X direction can indicate moving from the lower-right towards the upper-left in FIG. 1, while moving forwardly along the X direction can indicate the opposite direction as indicated by the arrowhead. Further, moving upwardly along the Z direction can indicate moving upward vertically as shown in FIG. 1 and as indicated by the arrowhead, while moving downwardly along the Z direction can indicate the opposite direction. Moving from the lower-left to the upper-right, from the perspective of FIG. 1, can indicate moving forwardly in the Y direction as indicated by the arrowhead, whereas moving in the opposite direction can indicate moving rearwardly in the Y direction.

The connector assembly 300 can include a connector 100 including a dielectric housing 10 having a mating front end 11 for mating with a mating connector 101 and an opposite rear end 12 defining a cable opening 13 therein. The connector 100 can also include a plurality of electrically conductive terminals 20 disposed at least partially in the dielectric housing 10. The terminals 20 can include termination portions 22 as well as mating portions 21 disposed proximate the mating front end 11 of the dielectric housing 10 for making electrical contact with corresponding 20 terminals of the mating connector 101. The electrically conductive terminals 20 can include any electrically-conductive material known to those skilled in the art, such as, but not limited to, metals, metal alloys, copper, silver, gold, aluminum, graphite, conductive polymers, conductive nonmetals, or steel.

A connector support 200, which can be exemplarily seen in FIG. 2 and elements of which can be seen in FIG. 4, can be included with the connector assembly 300. The connector support 200 can include a pair of U-shaped side supports 40 disposed on opposite sides of the dielectric housing 10. Each of the U-shaped side supports 40 can include an elongated base 41 disposed along, and substantially co-extensive with, a corresponding side 14 of the dielectric housing 10. Each of the U-shaped side supports 40 can also include a first leg 42 extending from a first end 41*a* of the base 41 and disposed on and facing the rear end 12 of the dielectric housing 10 and a second leg 43 extending from an opposite second end 41*b* of the base 41 and disposed on and facing the front end 11 of the dielectric housing 10. The first leg 42 can define a first opening 42*a* therein and the second leg 43 can define a second opening 43*a* therein.

Figure 5:
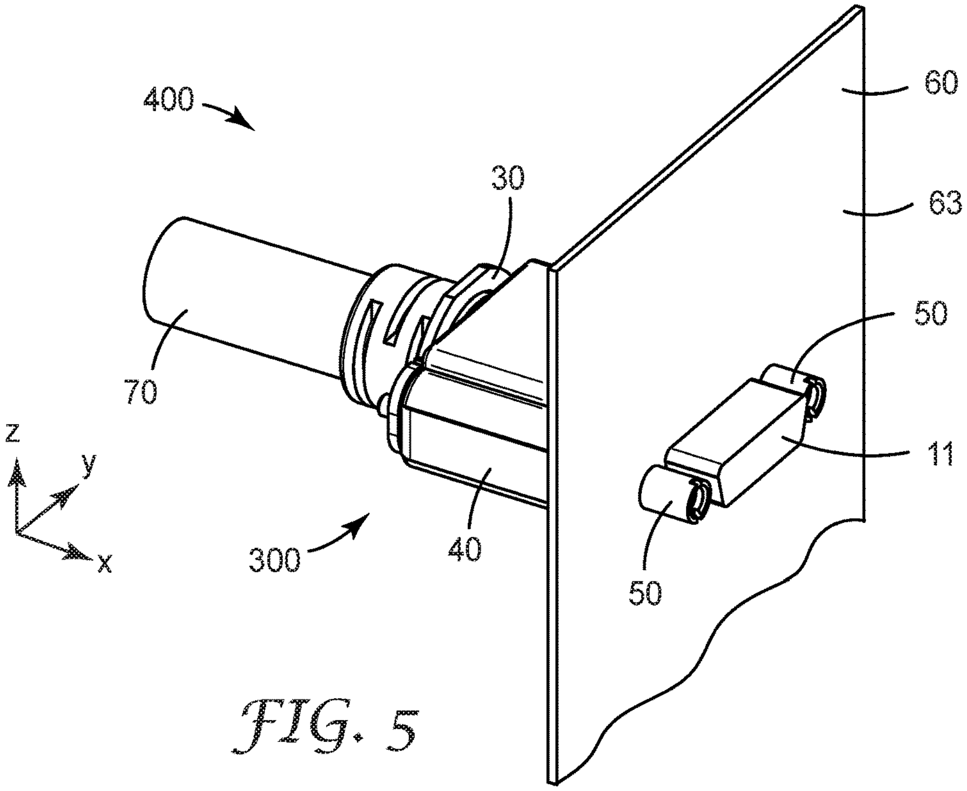
FIG. 5 is an upper perspective view of a fastened connector assembly according to exemplary embodiments of the present disclosure.
Figure 6:
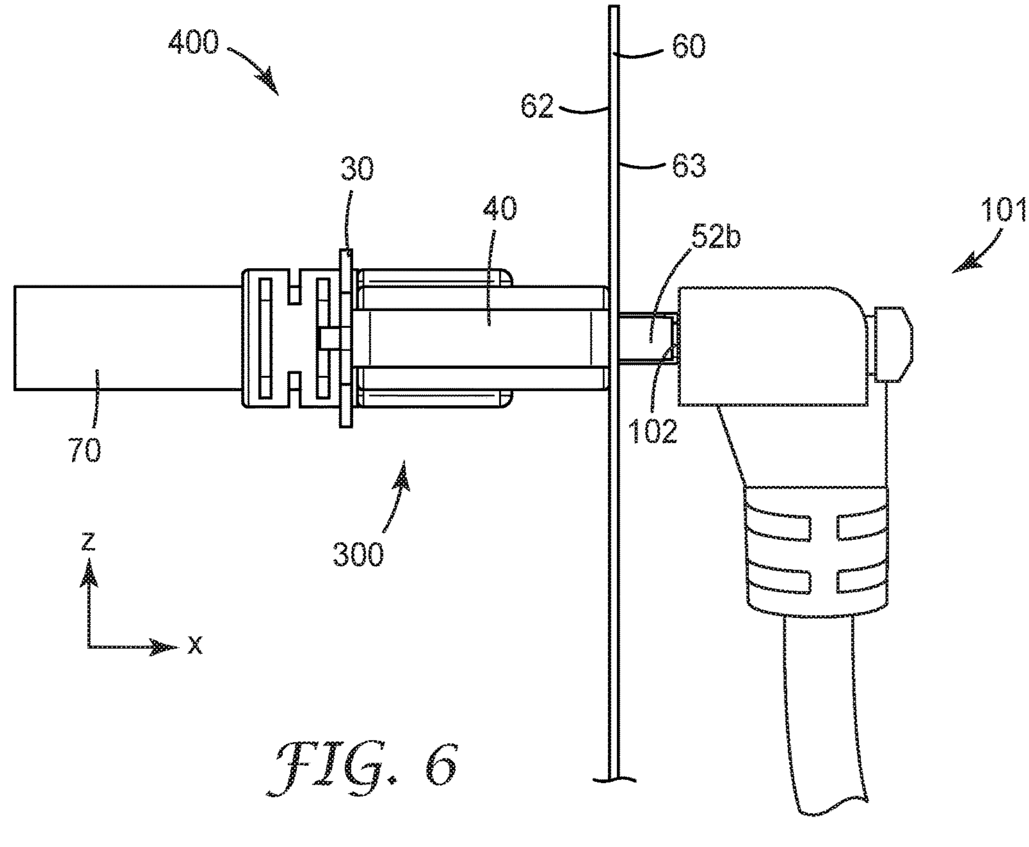
FIG. 6 is a side elevation view of a fastened connector assembly, further showing an attached secondary connector, according to exemplary embodiments of the present disclosure.

FIG. 5 is an upper perspective view of a fastened connector and FIG. 6 is a side elevation view of a fastened connector assembly, further showing an attached secondary connector, according to exemplary embodiments of the present disclosure. The connector support 200 can also include a pair of elongated fasteners 50. The elongated fasteners 50 can fasten the connector 100 to a plate 60. The plate 60 and the connector 100 can exemplarily be seen in FIGS. 5 and 6. Each of the elongated fasteners 50 can engage a corresponding side support 40 in the pair of side supports 40 such that a rear portion 51 of the elongated fastener 50 is disposed in the first opening 42*a* of the corresponding side support 40, and a front portion 52 of the elongated fastener 50 is disposed in the second opening 43*a* of the corresponding side support 40, as can be exemplarily seen in FIG. 7. A middle portion 53 of the elongated fastener 50 can extend between and connect the rear 51 and the front portions 52 and can be disposed inside of the housing 10. The elongated fasteners 50 can be tightenable and securable against the corresponding side support 40.

The connector assembly 300 can also include a cable 70, which can be exemplarily seen in FIG. 4. The cable 70 can include a plurality of conductors 71 received inside the housing 10 through the cable opening 13 of the housing 10. Further, the cable 70 can terminate, or be terminated, at the termination portions 22 of the electrically conductive terminals 20.

In various embodiments, the first openings 42*a* of the U-shaped side supports 40 are threaded, as can be seen in FIG. 2. In some embodiments, the rear portions 51 of the elongated fasteners 50 are threaded. The elongated fasteners 50 can be tightenable and securable against the side supports 40 by threading the threaded rear portions 51 of the elongated fasteners 50 into the threaded first openings 42*a* of the side supports 40.

The side supports 40 can be rigid and can be formed from any suitably rigid material known to those skilled in the art such as, but not limited to, a metal, metal alloy, steel, aluminum, copper, carbon, composite material, ceramic, polymer, or an organic material. As can be exemplarily seen in FIGS. 2 and 8, the first openings 42*a* of the U-shaped side supports 40 can be through-openings and can also have closed perimeters. In some embodiments, as can be exemplarily seen in FIG. 8, the second openings 43*a* of the U-shaped side supports 40 can be through-openings and can also have closed perimeters. In some embodiments, as can be exemplarily seen in FIG. 2, the second openings 43*a* of the U-shaped side supports 40 can be through-openings and can also have open perimeters. Each of the opposite sides 14 of the dielectric housing 10 can define a channel 15 (as can be seen in FIG. 3) therein extending along the side 14 between the front end 11 and the rear end 12 of the dielectric housing 10. The elongated bases 41 of the U-shaped side supports 40 can be disposed in the channels 15.

Figure 7:
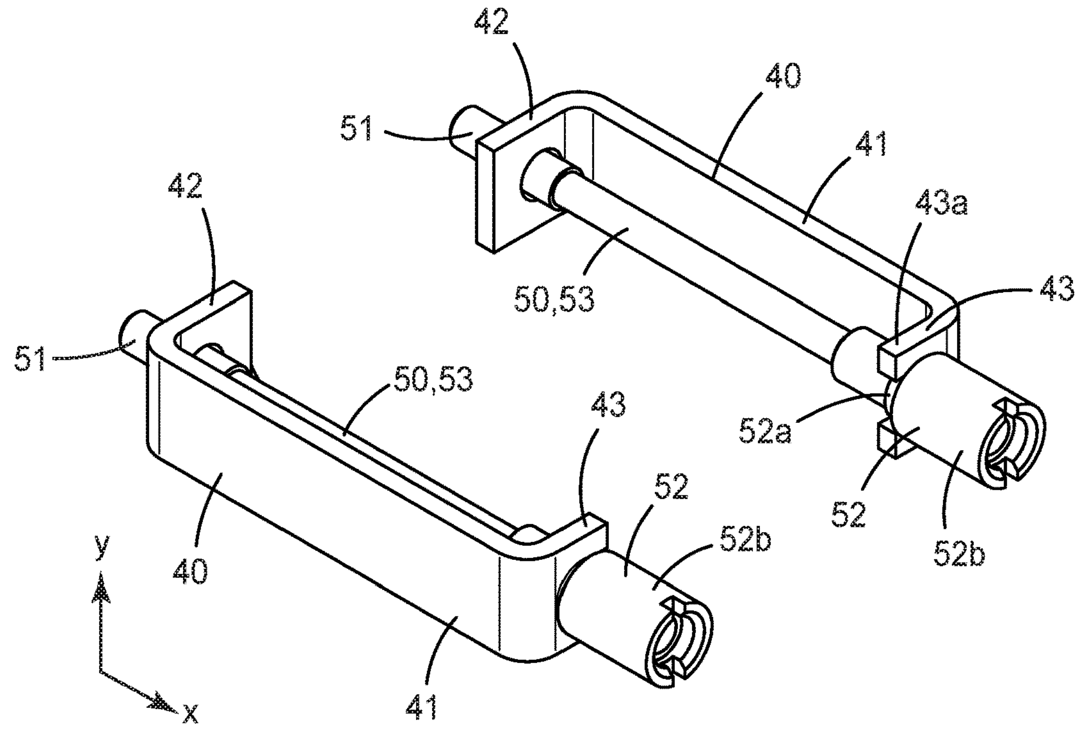
FIG. 7 is an upper perspective view of side supports and elongated fasteners according to exemplary embodiments of the present disclosure.
Figure 8:
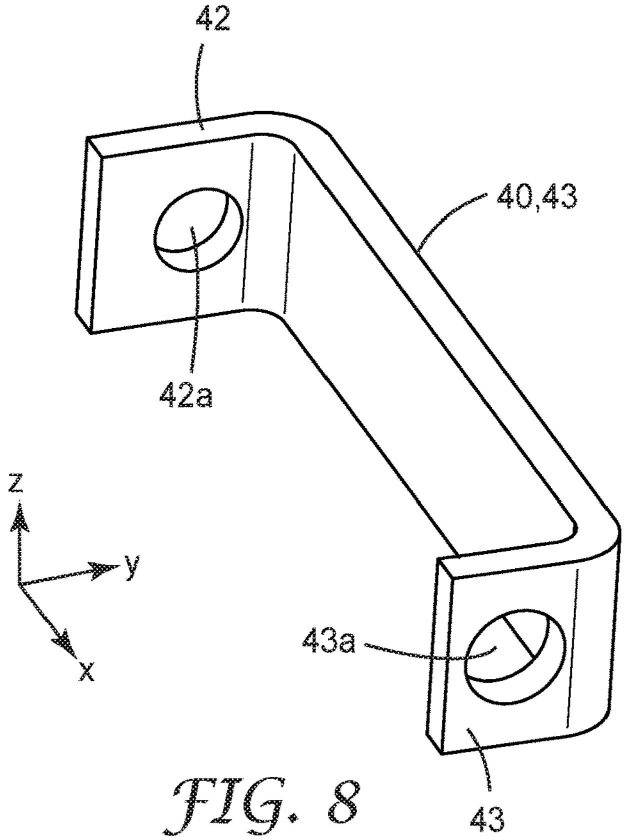
FIG. 8 is an upper perspective view of an embodiment of a side support according to exemplary embodiments of the present disclosure.
Figure 9:
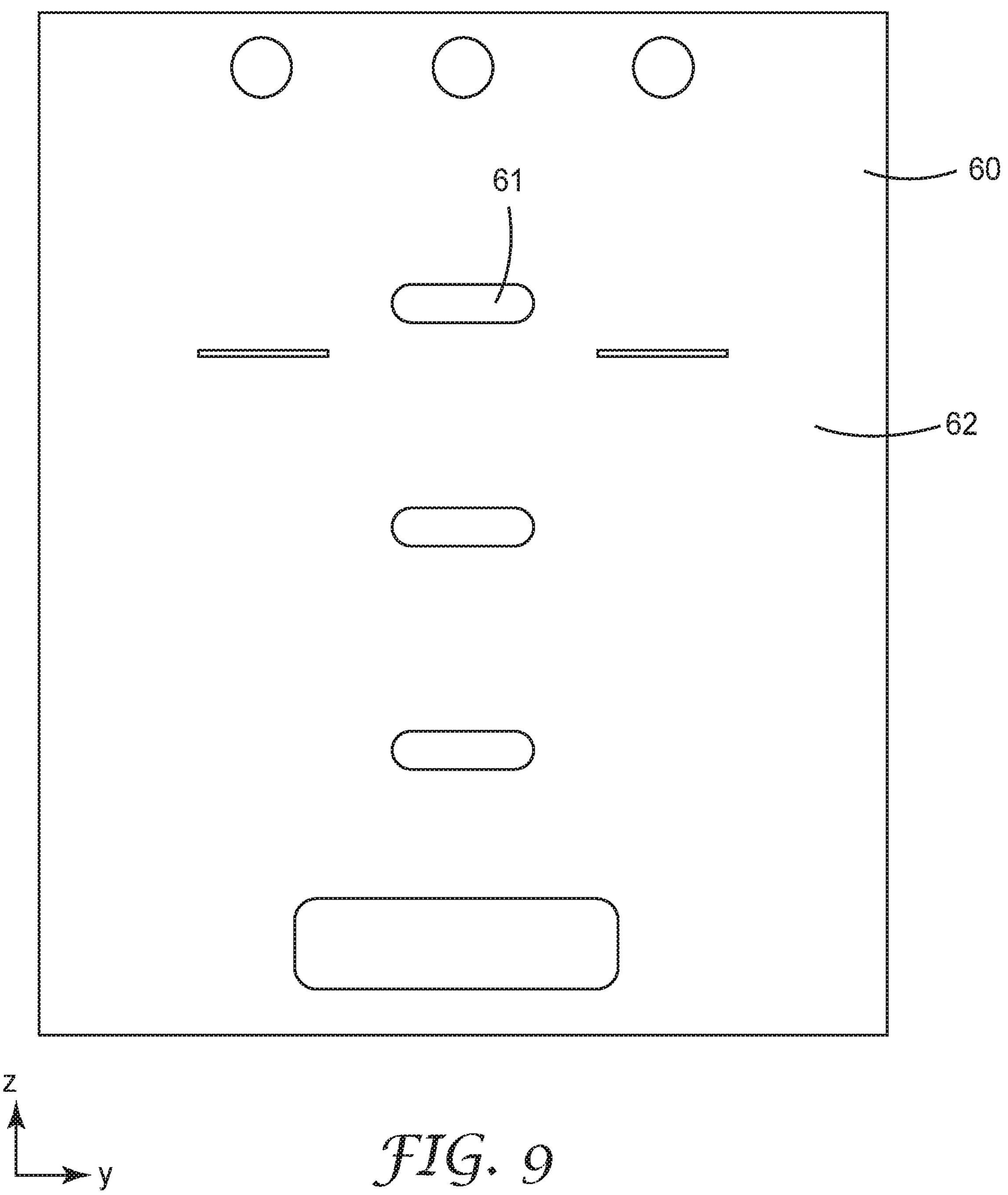
FIG. 9 is a front elevation view of a plate according to exemplary embodiments of the present disclosure.

FIG. 7 is an upper perspective view of side supports and elongated fasteners, FIG. 8 is an upper perspective view of an embodiment of a side support, and FIG. 9 is a front elevation view of a plate according to exemplary embodiments of the present disclosure. Turning to FIGS. 5 and 6, a fastened connector assembly 400 can include the plate 60 and one or more plate openings 61 can be formed therein. The fastened connector assembly 400 of can include the connector assembly 300 fastened to the plate 60 so that at least portions of the mating front end 11 of the dielectric housing 10 and the front portions 52 of the elongated fasteners 50 are disposed in at least one of the one or more plate openings 61 (exemplarily shown in FIGS. 6 and 9). The elongated fasteners 50 can be tightened against the side supports 40 to tightly secure the connector assembly 300 to the plate. In some embodiments, the mating connector 101 can be mated with the connector assembly 300 such that the connector assembly 300 is disposed on a front side 62 of the plate 60 and the mating connector 101 is disposed on an opposite back side 63 of the plate 60. As can be seen in FIG. 6, the mating connector 101 can include a pair of elongated mating fasteners 102 securely fastened to the elongated fasteners 50. In some embodiments, the front portions 52 of the elongated fasteners 50 are internally threaded (as can be seen exemplarily in FIGS. 2 and 10, among others) and ends portions of the mating fasteners 102 are externally threaded. The mating fasteners 102 can be securely fastened to the elongated fasteners 50 by the threaded end portions of the mating fasteners 102 being threaded into the threaded front portions 52 of the elongated fasteners 50. In various embodiments, the second legs 43 of the U-shaped side supports 40 are disposed on the front side 62 of the plate 60. The front portion 52 of each of the elongated fasteners 50 can have a narrower front portion 52*a* disposed in the at least one of the one or more plate openings 61, and the front portion 52 of each of the elongated fasteners 50 can also have a wider front portion 52*b* disposed on the opposite back side 63 of the plate 60. The wider front portion 52*b* can be sufficiently large such that it cannot pass through the at least one of the one or more plate openings 61.

In some embodiments, the connector assembly 300 includes a back support 30 disposed outside and at, or proximate, the rear end 12 of the dielectric housing 10. The back support 30 can define a center opening 31 which can be aligned with the cable opening 13, and the back support can also define a pair of opposing side openings 32 on opposite sides of the center opening 31. The first opening 42*a* of the first leg 42 of each of the U-shaped side supports 40 can be aligned with a corresponding side opening 32 of the back support 30. The rear portion 51 of each of the elongated fasteners 50 can be disposed in a corresponding side opening 32 of the back support 30. The plurality of conductors 71 of the cable 70 can be received inside the dielectric housing 10 through the center opening 31 of the back support 30. In various embodiments, the side openings 32 of the back support 30 are threaded and the rear portions 51 of the elongated fasteners 50 are threaded. The elongated fasteners 50 can be tightenable and securable against the back support 30 and the side supports 40 by threading the threaded rear portions 51 of the elongated fasteners 50 into the threaded side openings 32 of the back support 30. The back support 30 can be rigid and can be formed from any suitably rigid material known to those skilled in the art such as, but not limited to, a metal, metal alloy, steel, aluminum, copper, carbon, composite material, ceramic, polymer, or an organic material. In some embodiments, the fastened connector assembly 400 can include the plate 60 defining one or more plate openings 61 therein and the connector assembly 300 can be fastened to the plate 60 so that at least portions of the mating front end 11 of the dielectric housing 10 and the front portions 52 of the elongated fasteners 50 are disposed in at least one of the one or more plate openings 61. Further, the elongated fasteners 50 can be tightened against the back support 30 and the side supports 40 to tightly secure the connector assembly 300 to the plate 60.

Figure 10:
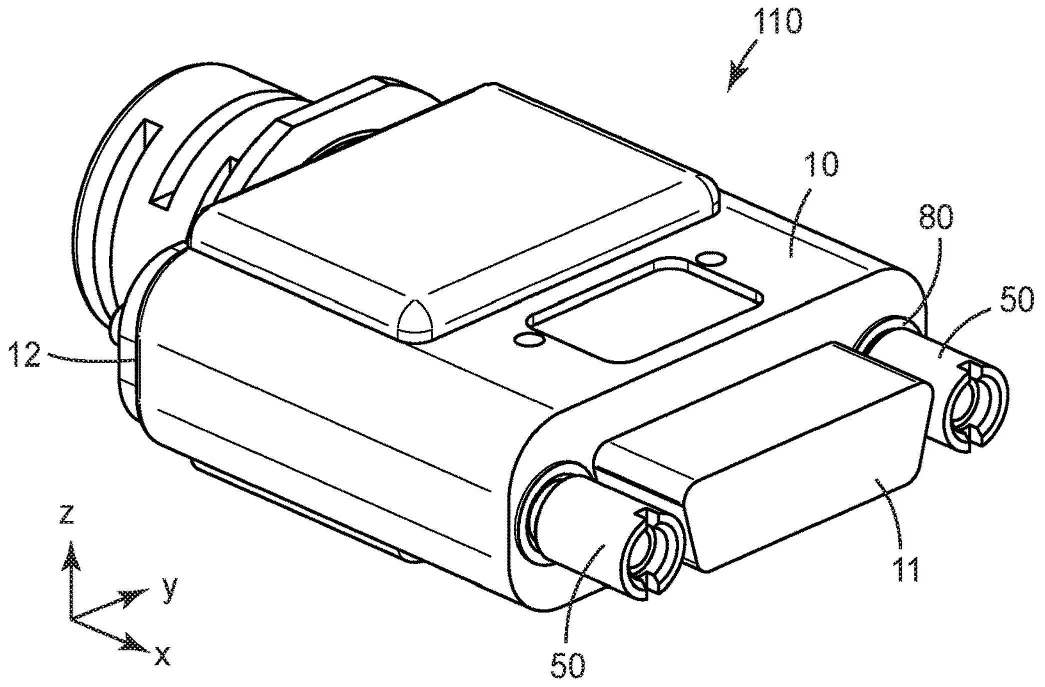
FIG. 10 is an upper perspective view of a connector assembly according to exemplary embodiments of the present disclosure.
Figure 11:
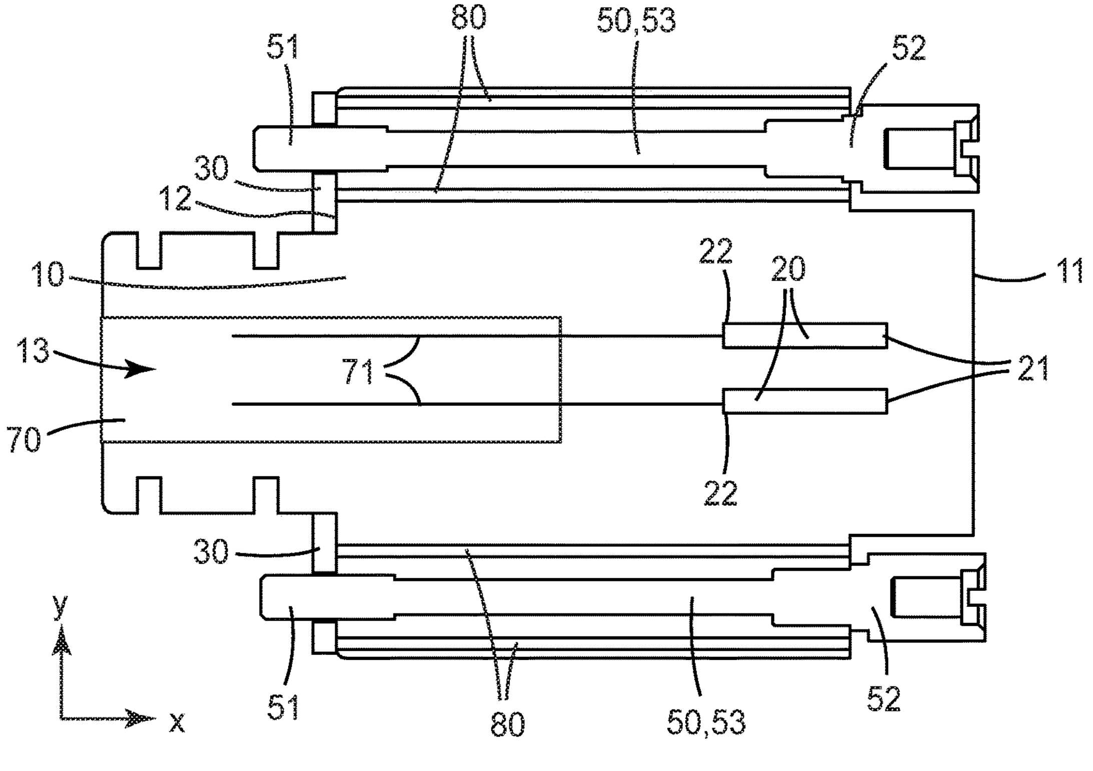
FIG. 11 is a cross-sectional view of the connector assembly of FIG. 10 according to exemplary embodiments of the present disclosure.
Figure 13:
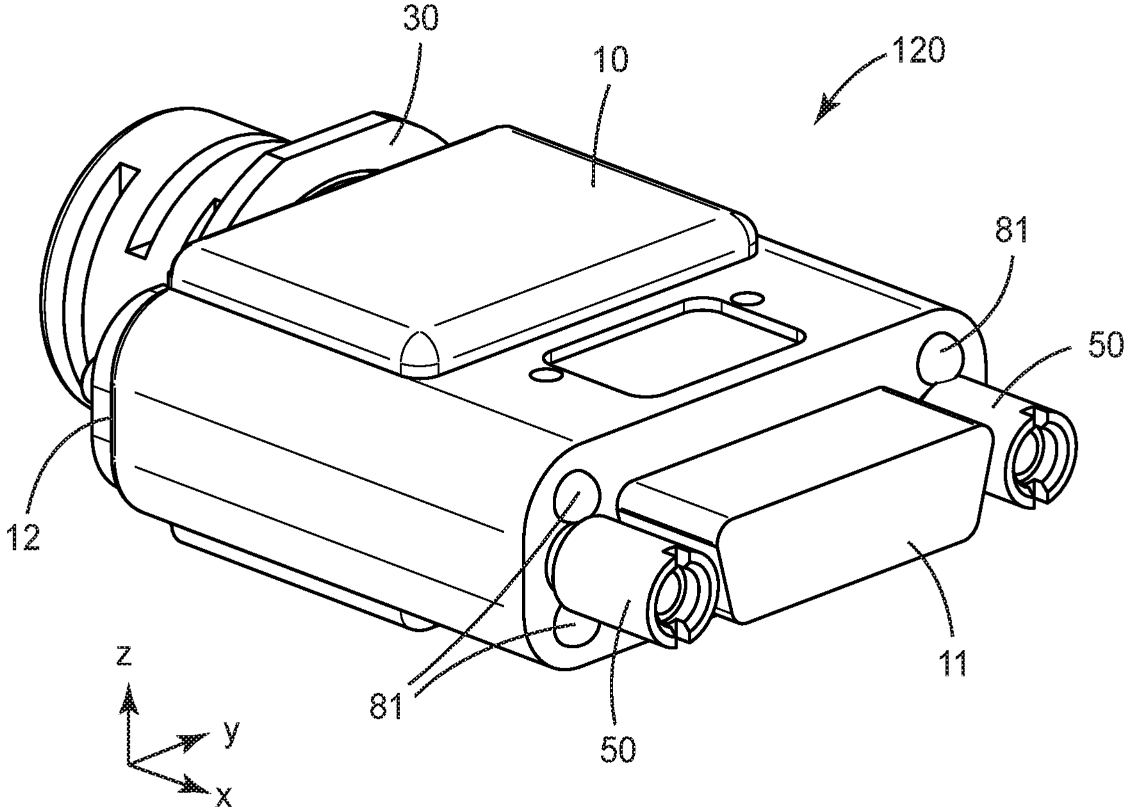
FIG. 13 is an upper perspective view of another embodiment of a connector assembly according to exemplary embodiments of the present disclosure.
Figure 14:
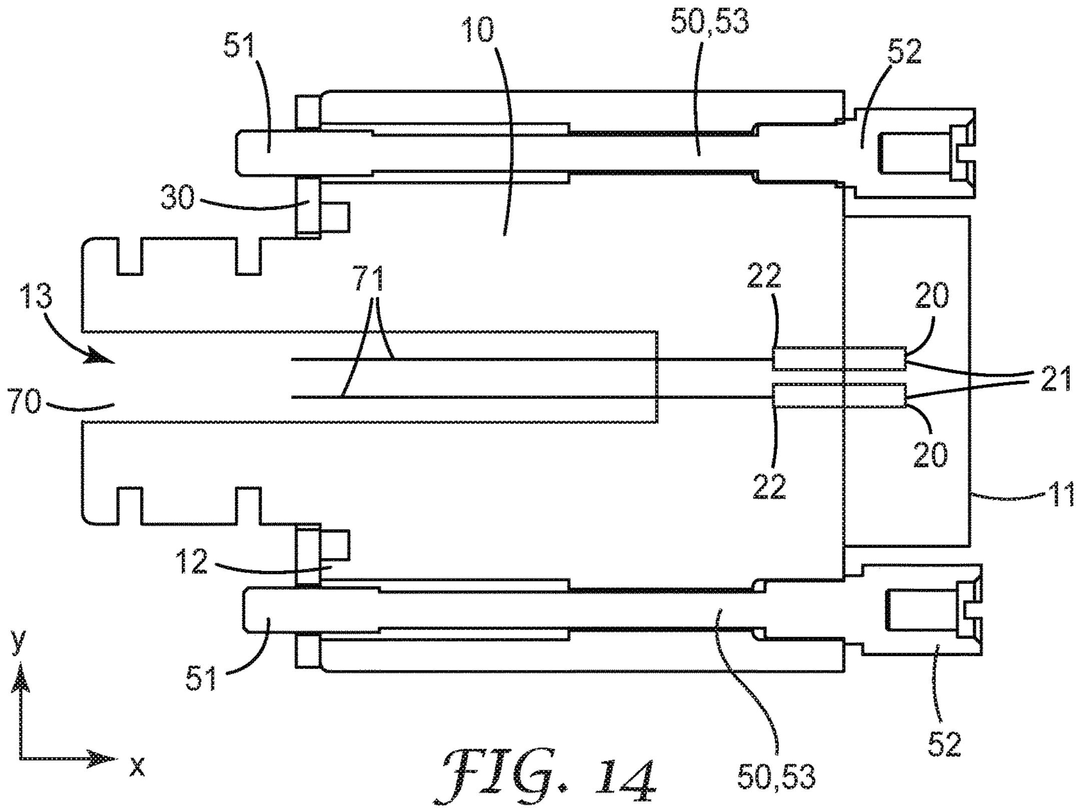
FIG. 14 is a cross sectional view of the connector assembly of FIG. 13, taken through the elongated fasteners, according to exemplary embodiments of the present disclosure.
Figure 15:
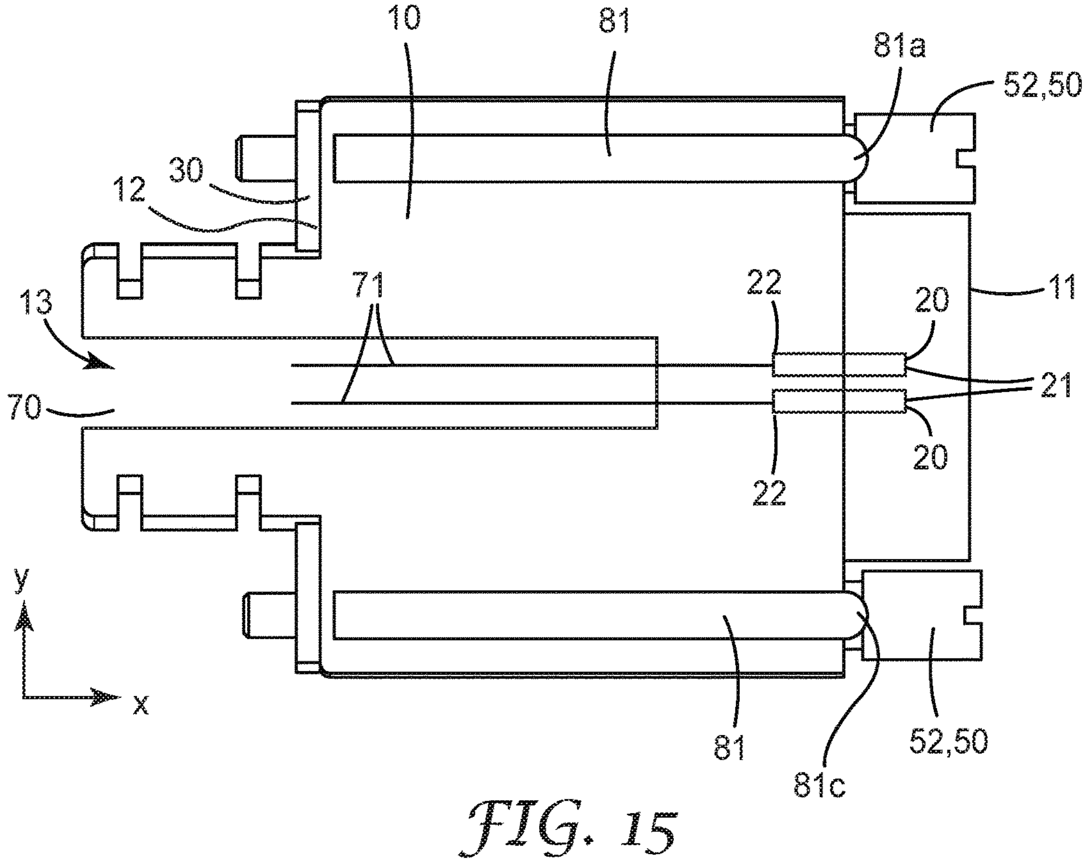
FIG. 15 is a cross sectional view of the connector assembly of FIG. 13, taken through the elongated rods, according to exemplary embodiments of the present disclosure.
Figure 16A:
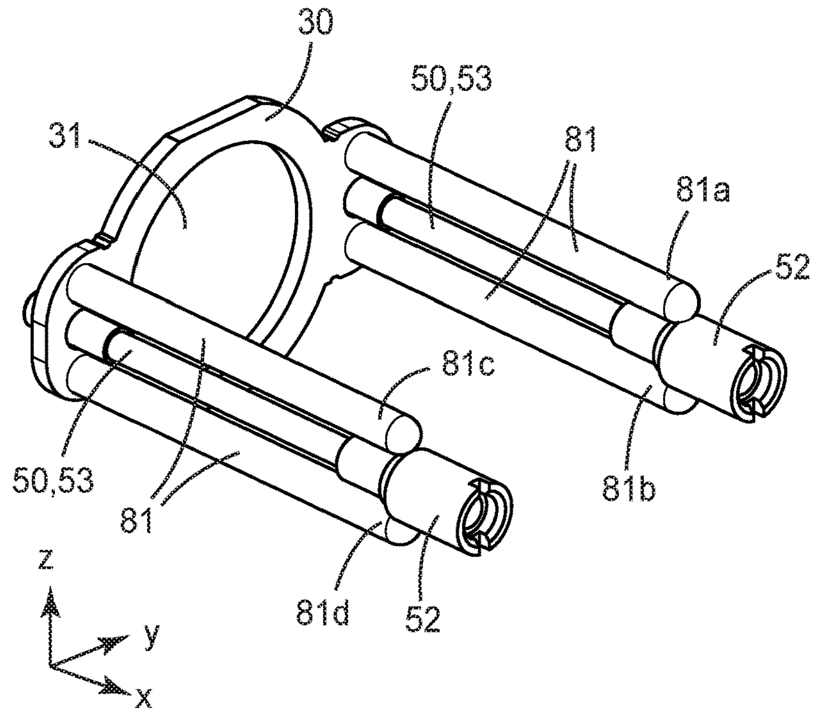
FIGS. 16A and 16B are upper perspective views of elongated rods, elongated fasteners, and a back support according to exemplary embodiments of the present disclosure.
Figure 16B:
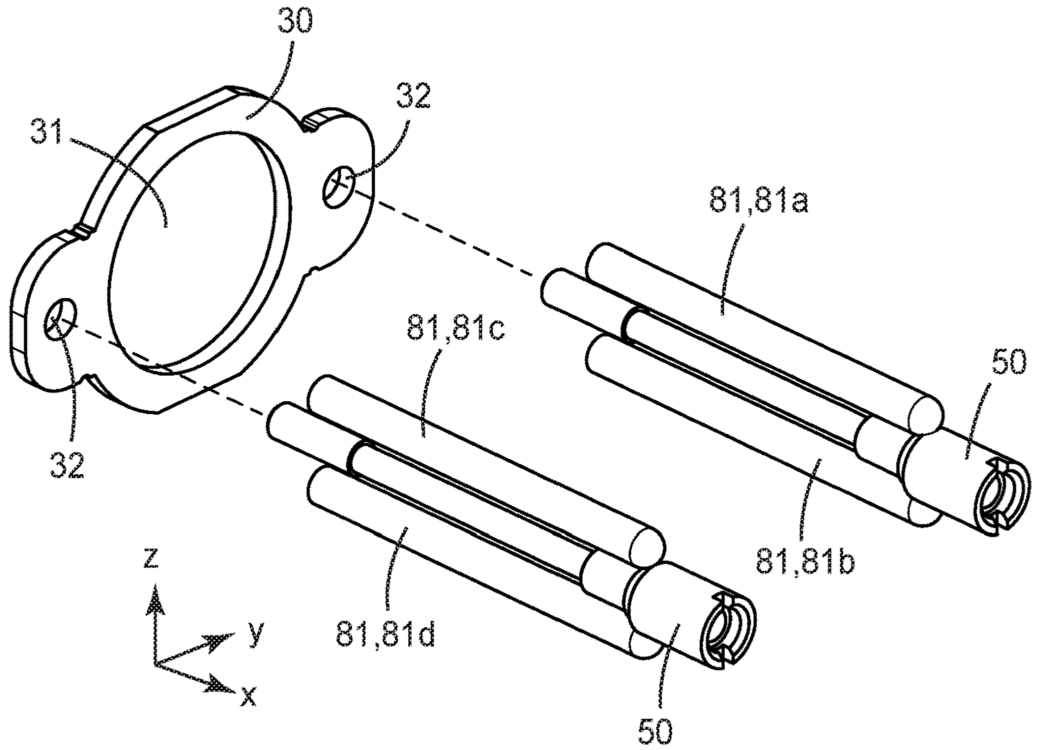

FIG. 10 is an upper perspective view of a connector assembly, FIG. 11 is a cross-sectional view of the connector assembly of FIG. 10, and FIGS. 12A, 12B, and 12C are views of a connector support, elongated rods, and elongated fasteners according to exemplary embodiments of the present disclosure. FIG. 13 is an upper perspective view of another embodiment of a connector assembly, FIG. 14 is a cross sectional view of the connector assembly of FIG. 13 taken through the elongated fasteners, FIG. 15 is a cross sectional view of the connector assembly of FIG. 13, taken through the elongated rods, and FIGS. 16A and 16B are upper perspective views of elongated rods, elongated fasteners, and a back support according to exemplary embodiments of the present disclosure. A connector assembly 300 can include a connector 110, 120 as can be seen in FIGS. 10 and 13. The connector 110, 120 can include a dielectric housing 10 having a mating front end 11 for mating with a mating connector 101 and an opposite rear end 12 defining a cable opening 13 therein. It is to be understood that the connector 110, 120, and elements thereof, can include or define all the above-listed properties, features, or configurations of the connector 100 or elements thereof. A plurality of electrically conductive terminals 20 can be disposed in the dielectric housing and can include mating portions 21 disposed proximate the mating front end 11 of the dielectric housing 10 for making electrical contact with corresponding terminals of the mating connector 101, and termination portions 22.

A connector support 210 can be assembled to the connector 110, 120 and include a back support 30 disposed outside and at the rear end 12 of the dielectric housing 10 and defining a center opening 31 aligned with the cable opening 13 and a pair of opposing side openings 32 on opposite sides of the center opening 31. It is to be understood that the connector support 210, and elements thereof, can include or define all the above-listed properties, features, or configurations of the connector support 200 or elements thereof. The connector support 210 can also include a plurality of elongated rods 80, 81 oriented along a mating direction (X-axis) of the connector 110, 120, and the elongated rods 80, 81 can be disposed inside of the housing 10 extending from the rear end 12 of the housing 10 to the front end 11 of the housing 10. The connector support 210 can further include a pair of elongated fasteners 50 for fastening the connector 110, 120 to a plate 60. Each of the elongated fasteners 50 can engage the back support 30 such that a rear portion 51 of the elongated fastener 50 is disposed in a corresponding side opening 32 of the back support 30. A front portion 52 of the elongated fastener 50 can be disposed outside and adjacent the front end 11 of the housing 10, and a middle portion 53 of the of the elongated fastener 50, extending between and connecting the rear portion 51 and the front portion 52, can be disposed inside of the housing 10. In some embodiments, the elongated fastener 50 is tightenable and securable against the back support 30. The connector assembly 300 can also include a cable 70 comprising a plurality of conductors 71 received inside the dielectric housing 10 through the cable opening 13 of the housing 10 and the center opening 31 of the back support 30 and terminated at the termination portions 22 of the conductive terminals 20.

In various embodiments, the elongated rods 80, 81 and the elongated fasteners 50 are substantially parallel with the X-axis, are substantially parallel with each other and/or are parallel with each other. Some embodiments include two, three, four, or more elongated rods 80, 81 in the plurality of elongated rods 80, 81.

Figure 12A:
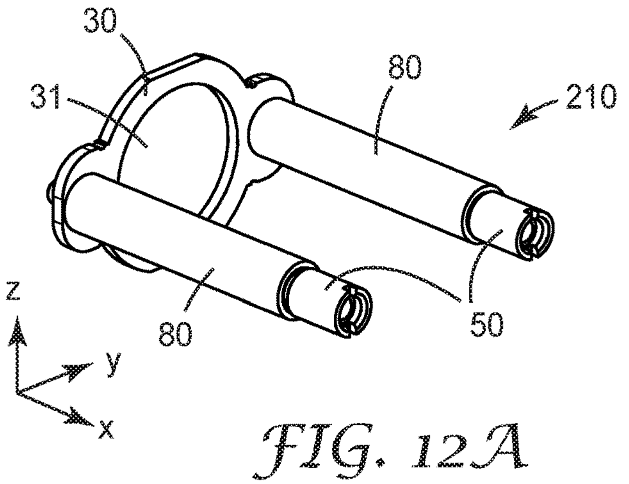
FIGS. 12A, 12B, and 12C are views of a connector support, elongated rods, and elongated fasteners according to exemplary embodiments of the present disclosure.
Figure 12B:
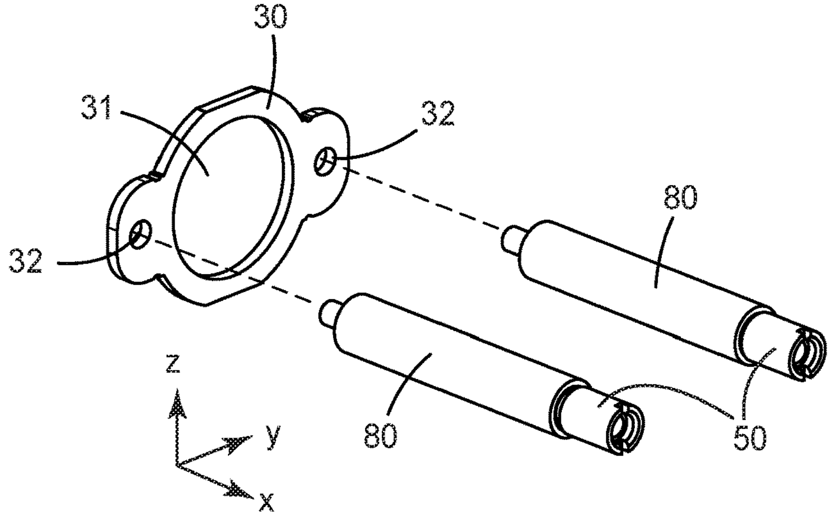
Figure 12C:
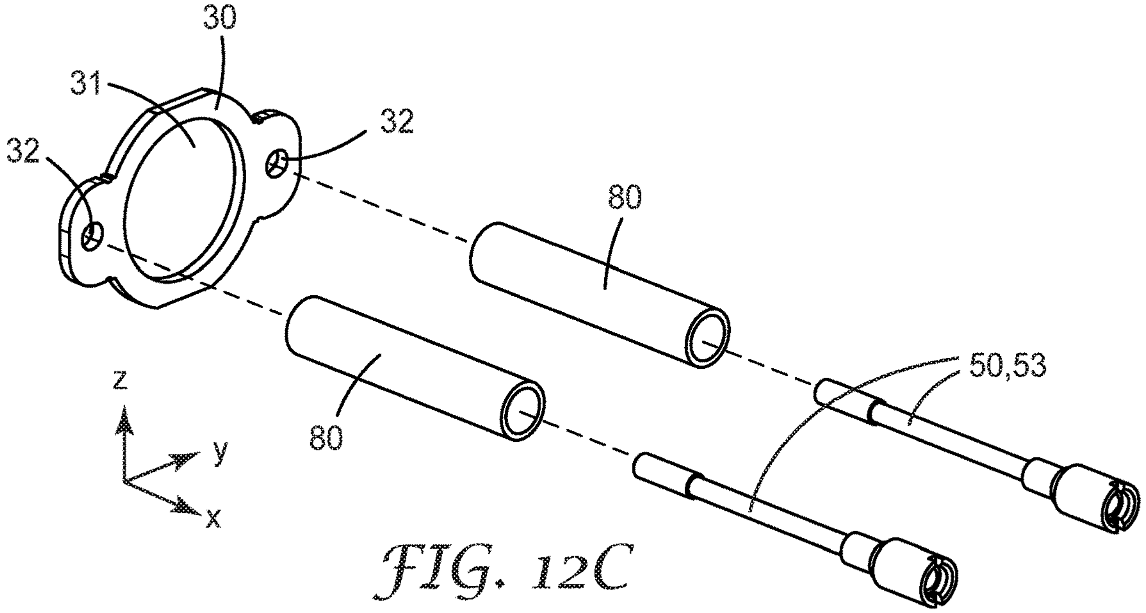

As can be exemplarily seen in FIGS. 11-12C, each of the elongated rods 80 can be hollow cylinders, and each of the elongated fasteners 50 can be disposed inside a corresponding one of the hollow cylinders or elongated rods 80. The elongated rods 80, 81, which in some embodiments are hollow cylinders or solid rods, can be rigid and can be formed from any suitably rigid material known to those skilled in the art such as, but not limited to, a metal, metal alloy, steel, aluminum, copper, carbon, composite material, ceramic, polymer, or an organic material.

Turning to exemplary embodiments shown in FIGS. 13-16B, one or more of the elongated rods 81 can be solid rods. Each of the elongated rods 81 can have a rear end (which can be with respect to the X-axis) fully embedded inside the housing 10 proximate the back support 30, and an opposite front end protruding from the housing 10 (which can be along the X-axis) adjacent the front end 11 of the housing 10. In various embodiments, each of the elongated rods 81 is fully encapsulated inside the housing 10 except that a front end, as measured along the X-axis, of the rod 81 protrudes slightly from a front side 11 of the housing 10 and/or a rear end, as measured along the X-axis, of the rod 81 protrudes slightly from the rear end 12 of the housing.

In various embodiments, such as those shown in FIGS. 16A and 16B, first 81*a* and second 81*b* elongated rods 81 of the four elongated rods 81 are disposed on opposite sides of one of the elongated fasteners 50 in the pair of elongated fasteners 50 along a thickness direction (Z-axis) of the dielectric housing 10, orthogonal to the mating direction (X-axis). Further, third 81*c* and fourth 81*d* elongated rods 81 in the four elongated rods 81 can be disposed on opposite sides of the other one of the elongated fasteners 50 in the pair of elongated fasteners 50 along the thickness direction (Z-axis) of the dielectric housing 10.

In various embodiments, a connector 100 can include a dielectric housing 10 having a mating end 11 for mating with a mating connector 101 and an opposite cable end 12. The mating end 11 and cable end 12 can be spaced apart along a mating direction (X-axis) of the connector 100. The dielectric housing 10 can be susceptible to an unacceptable deformation when exposed to at least one of temperature and pressure in their respective normal operating ranges. The connector 100, which can have the same properties, configurations, and features as the connectors 100, 110, 120 described above, can also include a plurality of electrically conductive terminals 20 disposed in the dielectric housing 10 and including mating portions 21 disposed proximate the mating end 11 of the dielectric housing 10 for making electrical contact with corresponding terminals of the mating connector 101. The termination portions 22 can be configured to at least make electrical contact with a plurality of conductors 71 of a cable 70. Additionally, the connector 100 can include a plurality of spaced apart metal supports 40, 80, 81 assembled to the dielectric housing 10 such that when the connector 100 is mated and tightly secured to the mating connector 101, the plurality of spaced apart metal supports 40, 80, 81 prevents the unacceptable deformation of the dielectric housing 10 due to the at least one of the temperature and pressure in their respective normal operating ranges.

In operation, a user or machine can affix elements of the connector 100, 110, 120 and/or connector assembly 300, to a plate 60, mating connector 101, or other piece of electromechanical hardware. During operation of the affixed assembly or other components, heat and/or pressure can be generated from the various elements. The disclosed embodiments provide numerous and effective configurations, materials, and elements (200, 40, 50, 30, 102, 80, 81) able to withstand large degrees of, or variations in, temperature and pressure generated by the operation of the electromechanical hardware. Because of the disclosed protective designs, other elements (such as the dielectric housing which may include a polymer) which may be more susceptible to deformation or other failure modes due to their shape, material, and/or configuration are protected by the protective elements (200, 40, 50, 30, 102, 80, 81). As a result, the connector 100, 110, 120 and/or connector assembly 300 are able to avoid damage and maintain functionality. The disclosed embodiments thus provide mechanisms for the efficient, secure, and stable operation of a connector assembly 300, connector 100, 110, 120, and/or a fastened connector assembly 400.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure. The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control.

What is claimed is:

1. A connector assembly, comprising:

a connector comprising:

a dielectric housing having a mating front end for mating with a mating connector and an opposite rear end defining a cable opening therein; and a plurality of electrically conductive terminals disposed at least partially in the dielectric housing and comprising mating portions disposed proximate the mating front end of the dielectric housing for making electrical contact with corresponding terminals of the mating connector, and termination portions;

a connector support assembled to the connector and comprising:

a pair of U-shaped side supports disposed on opposite sides of the dielectric housing, each of the U-shaped side supports having an elongated base disposed along, and substantially co-extensive with, a corresponding side of the dielectric housing, a first leg extending from a first end of the base and disposed on and facing the rear end of the dielectric housing and a second leg extending from an opposite second end of the base and disposed on and facing the front end of the dielectric housing, the first and second legs defining respective first and second openings therein; and a pair of elongated fasteners for fastening the connector to a plate, each of the elongated fasteners engaging a corresponding side support in the pair of side-supports such that a rear portion of the elongated fastener is disposed in the first opening of the corresponding side support, a front portion of the elongated fastener is disposed in the second opening of the corresponding side support, and a middle portion of the elongated fastener, extending between and connecting the rear and the front portions, is disposed inside of the housing, wherein the elongated fastener is tightenable and securable against the corresponding side support; and a cable comprising a plurality of conductors received inside the dielectric housing through the cable opening of the housing and terminated at the termination portions of the conductive terminals.

2. The connector assembly of claim 1, wherein the first openings of the U-shaped side supports are threaded, wherein the rear portions of the elongated fasteners are threaded, and wherein the elongated fasteners are tightenable and securable against the side supports by threading the threaded rear portions of the elongated fasteners into the threaded first openings of the side supports.

3. The connector assembly of claim 1, wherein the side supports comprise a metal.

4. The connector assembly of claim 1, wherein the side supports are rigid.

5. The connector assembly of claim 1, wherein the first openings of the U-shaped side supports are through openings.

6. The connector assembly of claim 1, wherein the first openings of the U-shaped side supports have closed perimeters.

7. The connector assembly of claim 1, wherein the second openings of the U-shaped side supports are through openings.

8. The connector assembly of claim 1, wherein the second openings of the U-shaped side supports have open perimeters.

9. The connector assembly of claim 1, wherein the second openings of the U-shaped side supports have closed perimeters.

10. The connector assembly of claim 1, wherein each of the opposite sides of the dielectric housing defines a channel therein extending along the side between the front and the rear ends of the dielectric housing, and wherein the elongated bases of the U-shaped side supports are disposed in the channels.

11. A fastened connector assembly comprising:

a plate defining one or more plate openings therein; and the connector assembly of claim 1 fastened to the plate so that at least portions of the mating front end of the dielectric housing and the front portions of the elongated fasteners are disposed in at least one of the one or more plate openings, the elongated fasteners tightened against the side supports to tightly secure the connector assembly to the plate.

12. The fastened connector assembly of claim 11 further comprising the mating connector mated with the connector assembly, such that the connector assembly is disposed on a front side of the plate and the mating connector is disposed on an opposite back side of the plate.

13. The fastened connector assembly of claim 11, wherein the mating connector comprises a pair of elongated mating fasteners securely fastened to the elongated fasteners.

14. The fastened connector assembly of claim 13, wherein the front portions of the elongated fasteners are internally threaded, wherein ends portions of the mating fasteners are externally threaded, and wherein the mating fasteners are securely fastened to the elongated fasteners by the threaded rear portions of the elongated fasteners being threaded into the threaded front portions of the elongated fasteners.

15. The fastened connector assembly of claim 11, wherein the second legs of the U-shaped side supports are disposed on a front side of the plate, wherein the front portion of each of the elongated fasteners has a narrower front portion disposed in the at least one of the one or more plate openings and a wider front portion disposed on an opposite back side of the plate, the wider front portion sufficiently large that is cannot pass through the at least one of the one or more plate openings.

16. The connector assembly of claim 1, wherein the connector support further comprises a back support disposed outside and at the rear end of the dielectric housing and defines a center opening aligned with the cable opening and a pair of opposing side openings on opposite sides of the center opening;

wherein, the first opening of the first leg of each of the U-shaped side supports is aligned with a corresponding side opening of the back support;

wherein, the rear portion of each of the elongated fasteners is disposed in a corresponding side opening of the back support; and wherein, the plurality of conductors of the cable is received inside the dielectric housing through the center opening of the back support.

17. The connector assembly of claim 16, wherein the side openings of the back support are threaded, wherein the rear portions of the elongated fasteners are threaded, and wherein the elongated fasteners are tightenable and securable against the back support and the side supports by threading the threaded rear portions of the elongated fasteners into the threaded side openings of the back support.

18. The connector assembly of claim 16, wherein the back support comprises a metal.

19. A fastened connector assembly comprising:

a plate defining one or more plate openings therein; and the connector assembly of claim 16 fastened to the plate so that at least portions of the mating front end of the dielectric housing and the front portions of the elongated fasteners are disposed in at least one of the one or more plate openings, the elongated fasteners tightened against the back support and the side supports to tightly secure the connector assembly to the plate.

* * * * *